(12) United States Patent
Fume et al.

(10) Patent No.: US 9,928,828 B2
(45) Date of Patent: Mar. 27, 2018

(54) TRANSLITERATION WORK SUPPORT DEVICE, TRANSLITERATION WORK SUPPORT METHOD, AND COMPUTER PROGRAM PRODUCT

(71) Applicant: KABUSHIKI KAISHA TOSHIBA, Minato-ku, Tokyo (JP)

(72) Inventors: Kosei Fume, Kanagawa (JP); Yuka Kuroda, Kanagawa (JP); Yoshiaki Mizuoka, Kanagawa (JP); Masahiro Morita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 22 days.

(21) Appl. No.: 15/090,776

(22) Filed: Apr. 5, 2016

(65) Prior Publication Data

US 2016/0217782 A1    Jul. 28, 2016

Related U.S. Application Data (63) Continuation of application No. PCT/JP2013/077669, filed on Oct. 10, 2013.

(51) Int. Cl.
*G06F 17/28* (2006.01)
*G10L 13/08* (2013.01)
(Continued)

(52) U.S. Cl.
CPC .......... *G10L 13/08* (2013.01); *G06F 17/2223* (2013.01); *G06F 17/2264* (2013.01);
(Continued)

(58) Field of Classification Search
CPC .. G06F 17/28; G06F 17/2836; G06F 17/2854; G06F 17/2863; G06F 17/2872;
(Continued)

(56) References Cited

U.S. PATENT DOCUMENTS 9,280,967 B2    3/2016   Fume et al.
2005/0060138 A1*  3/2005   Wang ..................... G06F 3/018
                                                   704/1
(Continued)

FOREIGN PATENT DOCUMENTS

JP    2004-309724 A    11/2004
JP    2005-345699 A    12/2005
(Continued)

OTHER PUBLICATIONS

International Search Report dated Jan. 21, 2014 as issued in corresponding PCT Application No. PCT/JP2013/077669.

*Primary Examiner* — Qi Han
(74) *Attorney, Agent, or Firm* — Foley & Lardner LLP (57) ABSTRACT

According to an embodiment, a transliteration work support device includes an analysis unit, a storage unit, an estimation unit, a construction unit, a correction unit, and an update unit. The analysis unit performs language analysis on document data and creates transliteration auxiliary information representing a way of transliteration of a word or a phrase in the document data. The storage unit stores a correction history representing a way of transliteration corrected in the past of the word or the phrase. The estimation unit estimates a correction place and a correction candidate of the document data or the transliteration auxiliary information from the history. The construction unit constructs work list information including work items corresponding to types of corrections according to the correction candidate and progress information. The correction unit corrects the document data or the transliteration auxiliary information. The update unit updates the history and the progress information according to the correction.

10 Claims, 10 Drawing Sheets

(51) Int. Cl.
*G10L 13/027* (2013.01)
*G06F 17/22* (2006.01)
*G06F 17/27* (2006.01)

(52) U.S. Cl.
CPC ........ *G06F 17/273* (2013.01); *G06F 17/2755* (2013.01); *G10L 13/027* (2013.01)

(58) Field of Classification Search
CPC ... G06F 17/2881; G06F 17/289; G10L 13/02; G10L 13/027; G10L 13/033; G10L 13/0335; G10L 13/04; G10L 13/043; G10L 13/047; G10L 13/08; G10L 13/10
USPC ........... 704/9, 2, 3, 5, 7, 258, 266, 277, 278

See application file for complete search history.

(56) References Cited

U.S. PATENT DOCUMENTS

| | | |
|---|---|---|
| 2008/0086307 A1 | 4/2008 | Okayama et al. |
| 2008/0120093 A1 | 5/2008 | Izumida et al. |
| 2011/0099000 A1* | 4/2011 | Rai ..................... G06F 17/2223 704/2 |
| 2011/0137635 A1* | 6/2011 | Chalabi ............... G06F 17/2863 704/2 |
| 2012/0239390 A1 | 9/2012 | Fume et al. |

FOREIGN PATENT DOCUMENTS

| | | |
|---|---|---|
| JP | 2007-199410 A | 8/2007 |
| JP | 2008-090771 A | 4/2008 |
| JP | 2008-146019 A | 6/2008 |
| JP | 2011-170191 A | 9/2011 |
| JP | 2012-198277 A | 10/2012 |
| JP | 2013-011828 A | 1/2013 |
| JP | 2013-041421 A | 2/2013 |

* cited by examiner

| ID | DOCUMENT INFORMATION | CONDITION 1 (SURFACE EXPRESSION) | CONDITION 2 (WORD CLASS) | CONDITION 3 (DOCUMENT GENRE) | APPLICATION RULE |
|---|---|---|---|---|---|
| 1 | docID:000230 | 兵十 | [NOUN] or [UNKNOWN WORD] | STORY | ヒ'ョージュー |
| 2 | docID:000230 | ごん | [NOUN] or [UNKNOWN WORD] | STORY | ゴ"ン |
| 3 | docID:000532 | マシマロ | * | * | マシュマロ |
| 4 | docID:000974 | えー、なんだってー | * | * | エー: ナ'ンダッテー? |

FIG.3

| ID | WORK ITEM NAME | SCORE | CONSTRAINT CONDITION |
|---|---|---|---|
| 1 | ACCENT ERROR | 50 | QUOTATION > READING ERROR > |
| 2 | READING ERROR | 38 | * |
| 3 | ACCENT SEPARATION | 33 | QUOTATION > |
| 4 | FREQUENTLY APPEARING KEYWORD | 40 | HEADLINE > BIBLIOGRAPHIC INFORMATION/FOOTNOTE > |
| 5 | HEADLINE | 17 | * |
| 6 | QUOTATION | 20 | * |
| 7 | BIBLIOGRAPHIC INFORMATION/ FOOTNOTE | 25 | * |
| 8 | PHONETIC ANNOTATION | 10 | * |

FIG.4

| | | |
|---|---|---|
| QUOTATION | > | ACCENT SEPARATION |
| QUOTATION | > | ACCENT ERROR |
| READING ERROR | > | ACCENT ERROR |
| ACCENT SEPARATION | > | ACCENT ERROR |
| HEADLINE | > | FREQUENTLY APPEARING KEYWORD |
| BIBLIOGRAPHIC INFORMATION/FOOTNOTE | > | FREQUENTLY APPEARING KEYWORD |

FIG.5

| TRANSLITERATION CLOUD SERVICE | | ⓘ INQUIRY |
|---|---|---|
| CONTINUOUS REPLAY | DISPLAY OF WORK LIST | LOGOUT |
| TRANSLITERATION CLOUD SERVICE | \| TOP PAGE > MY PAGE | WELCOME TARO |

NOTICE OF HOLDING A READING SESSION

⊖ ⊙ ⊕  REPLAY SPEED ⊖—○———⊕ 🔊  ⊖—○———⊕ VOLUME 🔊    REPLAY SPEED ⊖———○—⊕ 🔊

FROM 1ST TO 50TH LINES IN TOTAL 2751 LINES          1 2 3 4 5 6 7 8 9 <u>10</u> 11 12 13 14 15 NEXT...>

| LINE NUMBER | RECEIVED TEXT/ INTERMEDIATE LANGUAGE | SPEAKER | REMARKS | FLAG |
|---|---|---|---|---|
| ☐ 1 | キタル コウレイ ロウドクカイ<br>来る7月20日に恒例の朗読会を開催<br>いたします。 | タロー ▲ | | |
| ☐ 2 | コンカイ<br>今回は、ゲストに元〇〇テレビアナウンサーの<br>山田貴明氏をはじめ、△△大学の演劇<br>サークルから… | ジロー ▲ | | |

FROM 1ST TO 50TH LINES IN TOTAL 2751 LINES          1 2 <u>3</u> 4 5 6 7 8 9 <u>10</u> 11 12 13 14 15 NEXT...>

FIG.6

WORK LIST

| | |
|---|---|
| ACCENT ERROR | 0/29 PLACES |
| READING ERROR | 0/13 PLACES |
| ACCENT SEPARATION | 0/7 PLACES |
| FREQUENTLY APPEARING KEYWORD | 0/10 PLACES |
| HEADLINE | 0/3 PLACES |
| QUOTATION | 1/4 PLACES |
| BIBLIOGRAPHIC INFORMATION/FOOTNOTE | 1/4 PLACES |
| PHONETIC ANNOTATION | 3/83 PLACES |

D   C   B   A

CURRENT WORK QUALITY LEVEL

FIG.7

WORK LIST

| | |
|---|---|
| ACCENT ERROR | 0/29 PLACES |
| READING ERROR | 0/13 PLACES |
| ACCENT SEPARATION | 0/7 PLACES |
| FREQUENTLY APPEARING KEYWORD | 0/10 PLACES |
| HEADLINE | 0/3 PLACES |
| QUOTATION | 1/4 PLACES |
| BIBLIOGRAPHIC INFORMATION/FOOTNOTE | 1/4 PLACES |
| PHONETIC ANNOTATION | 3/83 PLACES |

| APPEARANCE LINE | EXPRESSION | CHARACTER POSITION FROM HEAD OF LINE | WORK FLAG |
|---|---|---|---|
| 33 | 兵十 | 0 | NOT YET DONE |
| 35 | ごん | 12 | DONE |
| 84 | かき | 28 | NOT YET DONE |
| ... | | | |
| ... | | | |

FIG.10

| APPEARANCE LINE | EXPRESSION | WORK FLAG |
|---|---|---|
| 1 | 1. PREFACE | NOT YET DONE |
| 44 | 2. BRIEF OVERVIEW | NOT YET DONE |
| 93 | 3. HISTORY | NOT YET DONE |

CASCADING MENU METHOD          MENU ICON METHOD

TRANSLITERATION WORK SUPPORT DEVICE, TRANSLITERATION WORK SUPPORT METHOD, AND COMPUTER PROGRAM PRODUCT

CROSS-REFERENCE TO RELATED APPLICATIONS

This application is a continuation of PCT international application Ser. No. PCT/JP2013/077669 filed on Oct. 10, 2013, which designates the United States; the entire contents of which are incorporated herein by reference.

FIELD

An embodiment described herein relates generally to a transliteration work support device, a transliteration work support method, and a computer program product.

BACKGROUND

In order to create contents easily understandable for persons who have a visual disability or a learning disability, Braille work or transliteration work is performed on documents. Most of such works are performed in small-sized projects voluntarily. Improvement in recent years of a computer environment, particularly, with the development of voice synthesis technology, makes it possible to replace or support reading voices conventionally read aloud by real voices with voice synthesis. Particularly, technological innovation in terminals, which had drawbacks in voice quality and function, has made it possible to read aloud text data including Kanji (Chinese syllabary characters) and Kana (Japanese syllabary characters) by synthesized voices having a natural voice feel using a voice synthesis function in recent years. The voice synthesis function is utilized in a standalone environment where an application achieving the voice synthesis function is installed in each terminal and a client server environment where the application is installed in a server, for example.

DETAILED DESCRIPTION

According to an embodiment, a transliteration work support device includes an analysis unit, a storage unit, an estimation unit, a construction unit, a correction unit, and an update unit. The analysis unit performs language analysis on document data and creates transliteration auxiliary information representing a way of transliteration of a word or a phrase included in the document data. The storage unit stores therein a correction history representing a way of transliteration, which has been corrected in the past, of the word or the phrase. The estimation unit estimates a correction place and a correction candidate of the document data or the transliteration auxiliary information from the correction history. The construction unit constructs work list information including work items corresponding to respective types of corrections according to the correction candidate and including progress information about the work items. The correction unit receives a correction instruction and corrects the document data or the transliteration auxiliary information. The update unit updates the correction history and the progress information in the work list information in accordance with the correction performed by the correction unit.

An embodiment will be described below in detail with reference to the accompanying drawings.

Figure 1:
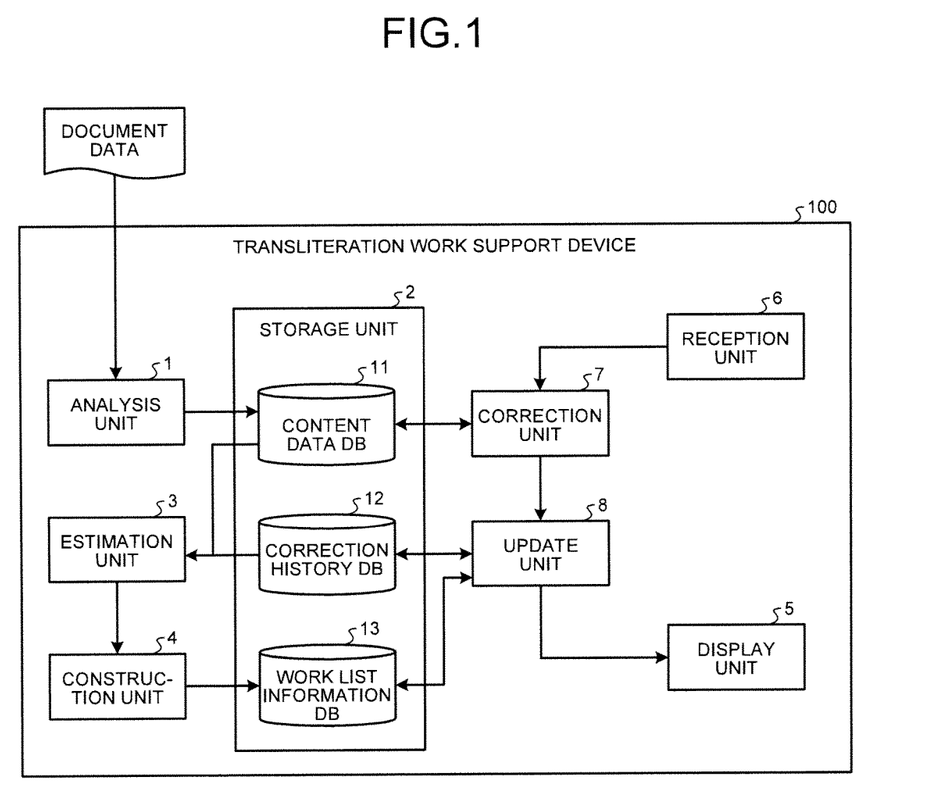
FIG. 1 is a schematic diagram illustrating an exemplary structure of a transliteration work support device in an embodiment.

FIG. 1 is a schematic diagram illustrating an exemplary structure of a transliteration work support device 100 in the embodiment. The transliteration work support device 100 in the embodiment includes an analysis unit 1, a storage unit 2, an estimation unit 3, a construction unit 4, a display unit 5, a reception unit 6, a correction unit 7, and an update unit 8. The storage unit 2 stores therein a content data DB 11, a correction history DB 12, and a work list information DB 13.

The analysis unit 1 performs a language analysis on document data. The document data is information in which voices of voice data are expressed as a document. The analysis unit 1 performs the language analysis on the document data used for voice synthesis, for example. Sentences included in the document data may belong to any genre. The document data is not limited to books such as novels, magazines, educational materials, textbooks, and specialized books. The document data may be notifications, guides, letters, and mails, for example. In the language analysis, a morphological analysis is performed on the sentences of the document data, and a detection of logical elements of the document data is performed, for example. In the morphological analysis, the sentences included in the document data are decomposed into morphemes, and word classes are determined. In the detection of the logical elements, logical element information that indicates a layout of the sentences included in the document data is detected based on headline elements, blank lines, and differences in indents that are included in the document. More specifically, if tag information indicating the layout of the sentences is included in the document data, the analysis unit 1 detects the logical element information from the tag information, for example. If no tag information is included in the document data, the analysis unit 1 detects a line as the logical element information representing a headline expression in the case in which the head of the line starts with a symbol or a numeral sequence, or blank lines are present before and after the line and the line is present as an isolated line having the smaller number of characters than an average of that in near lines.

In the language analysis, nouns including proper nouns, unknown words absent in dictionaries, and their compound words are also detected. Based on the result of the language analysis, the analysis unit 1 creates transliteration auxiliary information that represents ways of transliteration of words and phrases included in the document data. The transliteration auxiliary information represents readings, accent positions, and reading speeds of respective words and phrases, for example. Words are each composed of one or more morphemes. Phrases are each composed of one or more words.

The analysis unit 1 also calculates statistical information that represents an appearance frequency of a word or phrase in the language analysis. The statistical information is a TF/IDF or C-value, for example. The TF/IDF represents an appearance frequency (TF) of a word or a phrase in single document data and an inverse document frequency (IDF) of the word or the phrase appearing in a plurality of pieces of document data. The C-value represents a connection degree between words in a compound word composed of a plurality of words. The C-value is used for determining the separation positions of words in the compound word. The TF/IDF and the C-Value are already well known as the statistical information. The detailed explanations thereof are, thus, omitted.

The analysis unit 1 adds the statistical information to the transliteration auxiliary information to form metadata, and associates the metadata with the document data. The analysis unit 1 stores the document data and the metadata in the content data DB 11.

The estimation unit 3 reads the document data and the metadata from the content data DB 11. The estimation unit 3 separates the sentence included in the document data into words and phrases such as specific words and phrases on the basis the transliteration auxiliary information included in the metadata. The estimation unit 3 searches the correction history DB 12 using those words or phrases as a search key and estimates a correction place (the word or the phrase serving as a correction target) and a correction candidate of the transliteration auxiliary information. The following describes the correction history DB 12.

Figure 2:
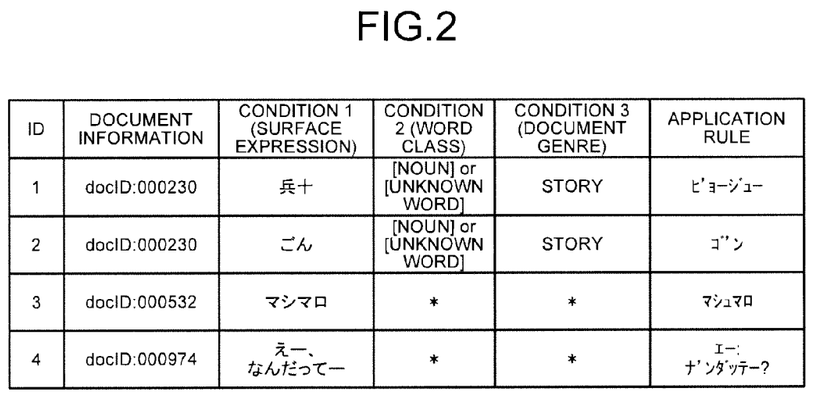
FIG. 2 is a schematic diagram illustrating an example of a correction history DB in the embodiment.

FIG. 2 is a schematic diagram illustrating an example of the correction history DB in the embodiment. The correction history DB stores therein a way of transliteration, which has been corrected in the past, of the word or the phrase in association with information that indicates what kind of correction has been performed under what kind of condition. The correction history DB in the embodiment includes ID, document information, condition 1, condition 2, condition 3, and application rule fields. The ID is identification information that identifies a record in the correction history DB. The ID is a serial number, for example. The document information is a number that uniquely indicates original information about the source of the word or the phrase registered in the correction history DB. The document information is an international standard book number (ISBN) or a universally unique identifier (QUID), for example. The condition 1 (surface expression) is surface information about the word or the phrase. The condition 2 is information that indicates a type of word class in the condition 1 (surface expression). The condition 3 (document genre) is information that indicates the genre of the document. The application rule is information that indicates a correction candidate applied to the word or the phrase satisfying the conditions 1 to 3. The conditions 2 and 3 are not necessary to be always set. The conditions 2 and 3 may be set in a case in which more detailed constraint information about the condition 1 (surface expression) is required. The application rule (correction candidate) may be determined using a dictionary, which is not illustrated in FIG. 1, in which a reading and an accent for each document genre are defined.

The following specifically describes the correction history DB 12 illustrated in FIG. 2. The record having an ID of 1 in the correction history DB 12 indicates that the surface expression "兵十" is determined to be a noun or an unknown word and the reading and accent "ヒ' ョージュー" is the correction candidate when the document data serving as the correction target is a story. "ヒ' ョージュー" is an intermediate language and "'" indicates the accent position. The intermediate language is used in the transliteration work support device for presenting a way of pronunciation of the word or the phrase included in the document data. The source of the surface expression "兵十" is identified by the document information "doc ID: 000230".

In the example of the record having an ID of 3, "マシマロ" is set to the surface expression of the condition 1, an asterisk (*) is set to each of the conditions 2 and 3, and "マシュマロ" is set in the application rule. Those settings indicate that the correction candidate of "マシマロ" may be "マシュマロ" for any noun and any document genre. In the example of the record having an ID of 4, the surface expression "えー、なんだってー" of the condition 1 does not include "?" whereas the correction candidate (application rule) for the reading of the surface expression is "エー：ナ' ンダッテー？", which includes the symbol (?) of a rise in pitch at the end. The application rule "エー：ナ' ンダッテー？" of the record having an ID of 4 indicates that the surface expression "えー、なんだってー" is separated into "エー" and "ナ' ンダッテー？". "ナ' ンダッテー？" indicates that "ナ" is accented and "ナ' ンダッテー？" is pronounced with a rise in pitch at the end.

In the correction history DB 12, a plurality of application rules may be associated with a single surface expression. As an exemplary method for associating a plurality of application rules with a single surface expression, one of the application rules may be associated with the single surface expression in accordance with the condition out of the conditions 2 and 3 different from each other by being changed. Alternatively, the multiple application rules may be associated with the single surface expression by identical setting of the conditions 2 and 3. In this case, the transliteration work support device 100 presents multiple correction candidates for a single correction place to the operator.

Referring back to FIG. 1, the estimation unit 3 transmits, to the construction unit 4, the information indicating the correction places and correction candidates for the words and the phrases included in the document data as well as the statistical information about the words and the phrases included in the correction places. The construction unit 4 constructs work list information that includes work items corresponding to respective types of corrections according to the correction candidates and that includes progress information about the work items. The construction unit 4 stores the work list information in the work list information DB 13. The following describes the work list information DB.

Figure 3:
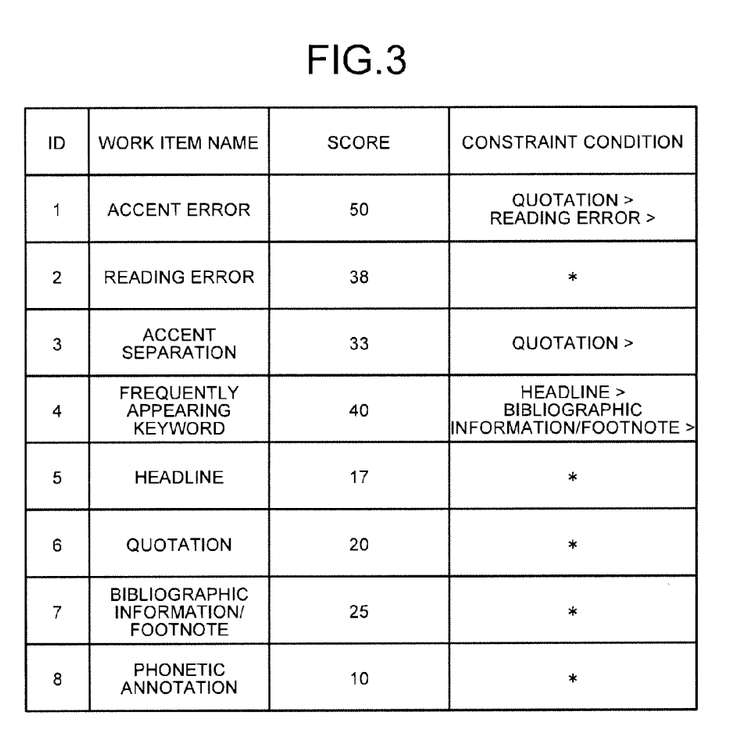
FIG. 3 is a schematic diagram illustrating an example of a work list information DB in the embodiment.

FIG. 3 is a schematic diagram illustrating an example of the work list information DB in the embodiment. The work list information DB in the embodiment includes ID, work item name, score, and constraint condition fields. The work list information DB stores therein the work items and the attributes (scores and constraint conditions) of the work items. The ID is the identification information that identifies a record in the work list information DB. The ID is a serial number, for example. The work item name is the name of the work item. The example illustrated in FIG. 3 has eight types of work items. The work items in the example illustrated in FIG. 3 are an "accent error", a "reading error", an "accent separation", a "frequently appearing keyword", a "headline", a "quotation", a "bibliographic information/footnote", and a "phonetic annotation". The construction unit 4 allocates one or multiple work items for the correction place of the word or the phrase serving as a single work based on the correction candidate. The allocation of the multiple work items for the correction place is a case in which a single correction place corresponds to the "accent error" and the "reading error", for example. The following describes work contents of the respective work items.

The "accent error" represents work for correcting the accent error of the word or the phrase. Specifically, the display unit 5, which is described later, displays the correction candidate for the word or the phrase probably having an accent error to the operator. The operator corrects the accent error while referring to the displayed correction candidate. The correction candidate for the accent of the word or the phrase is estimated by the estimation unit 3 from correction history in the past and the statistical information about the word or the phrase in the document. The statistical information about the word or the phrase is used when a plurality of accent positions are estimated and a single accent position is estimated by a majority vote, for example. Examples of the word or the phrase probably having an accent error include "おはようございまーす。" and "そうですよねー。".

The "reading error" represents work for correcting a reading error of the word or the phrase. Specifically, the display unit 5, which is described later, displays a correction candidate for the reading of the word or the phrase probably having a reading error to the operator. The operator corrects the reading error while referring to the displayed correction candidate. The correction candidate for the reading of the word or the phrase is estimated by the estimation unit 3 from correction history in the past and the statistical information about the word or the phrase in the document in the same manner as the "accent error". Examples of the word or the phrase that the user needs to explicitly designate because the word or the phrase probably has a reading error or variations include a case in which "市場" is pronounced as "いちば" or "しじょう" in reading.

The "accent separation" represents work for correcting an accent separation error of the word or the phrase. Specifically, the display unit 5, which is described later, displays a correction candidate for the separation of the word or the phrase probably having an accent separation error to the operator. The operator corrects the accent separation error while referring to the displayed correction candidate. The correction candidate for the reading of the word or the phrase is estimated by the estimation unit 3 from correction history in the past and the statistical information about the word or the phrase in the document in the same manner as the "accent error". Examples of the word or the phrase probably having an accent separation error include a case in which "小学校へはいったのは" is read "小学校へ／はいったのはと" or "小学校へはノいったのは" with different accent separations.

The "frequently appearing keyword" represents work for confirming the reading or the accent of an important word or an important phrase. Specifically, the display unit 5, which is described later, displays the reading or the accent of the important word or the important phrase to the operator so as to encourage the operator to confirm it. The estimation unit 3 estimates, as the important word or the important phrase, the word or the phrase having a high appearance frequency in the document data serving as the correction target or in the document data handled in the past.

The "headline" represents work for confirming the readings or the accents of the lines that start with "first chapter" and "1. . . ." out of the sentences of the document data. Specifically, the display unit 5, which is described later, displays the readings or the accents of the lines that start with "first chapter" and "1. . . ." to the operator so as to encourage the operator to confirm them. The lines that start with "first chapter" and "1. . . ." are estimated by the estimation unit 3 from the logical element information included in the transliteration auxiliary information.

The "quotation" represents work for confirming the reading or the accent of the word or the phrase in a quoted sentence out of the sentences of the document data. Specifically, the display unit 5, which is described later, displays the reading or the accent of the word or the phrase included in the quoted sentence to the operator so as to encourage the operator to confirm it. The word or the phrase included in the quoted sentence is estimated by the estimation unit 3 from the logical element information included in the transliteration auxiliary information. The estimation unit 3 identifies a depth of the indent of the sentence by the logical element information, and estimates that the sentence is the quoted sentence based on the depth of the indent, for example.

The "bibliographic information/footnote" represents work for confirming the reading or the accent of the word or the phrase in the bibliographic information/footnote out of the sentences of the document data. Specifically, the display unit 5, which is described later, displays the reading or the accent of the word or the phrase included in the bibliographic information/footnote to the operator so as to encourage the operator to confirm it. The word or the phrase included in the bibliographic information/footnote is estimated by the estimation unit 3 from the logical element information included in the transliteration auxiliary information. Examples of the bibliographic information/footnote include a paragraph in which comments on terms are described to provide footnote information, and a line for bibliographic information (issuing date or complier's name such as volunteer group A) described at the head or end of the document.

The "phonetic annotation" represents work for confirming the reading or the accent of the word, the unknown word, or the phrase to which a ruby tag (<ruby>) is attached out of the sentences of the document data. Specifically, the display unit 5, which is described later, displays the reading or the accent of the word or the phrase to which the ruby tag (<ruby>) is attached to the operator so as to encourage the operator to confirm it. The word or the phrase to which the ruby tag (<ruby>) is attached is estimated by the estimation unit 3 from the logical element information included in the transliteration auxiliary information.

The work contents of the respective work items in the work list information DB 13 illustrated in FIG. 3 are described above. Referring back to FIG. 3, the respective fields of the work list information DB illustrated in FIG. 3 are explained. The score represents a work effect of each work item. The example illustrated in FIG. 3 indicates that as the value of the score is higher, the effect of improving quality in voice synthesis using the document data after the completion of the work is higher. The score is estimated by the construction unit 4 using the following equation (1), for example.

$$\text{score}(D,I) = \Sigma(WIi*f(Ii,D) + Whi*Ph(Ii,D)) \qquad (1)$$

The following describes the symbols in equation (1). D represents the document data. I represents the work item. score(D,I), thus, represents the score of a specific work item in a specific document. WIi represents the weight of the work item I. Ii represents the ith element (word or phrase serving as the correction target) included in the work item I. f(Ii,D) represents the number of appearance times of the element i in the document data D. Whi represents the weight of each item in correction history. Ph(Ii,D) represents the number of appearance times of Ii in the correction history.

Referring back to FIG. 3, the constraint condition indicates the constraint in the order of work when the multiple work items are required. For example, "quotation>" and "reading error>" are designated as the constraint condition of the work item "accent error" having an ID of 1. This constraint condition indicates that the work "quotation" and the work "reading error" are preferably performed before performing the work "accent error". The constraint conditions are preliminarily defined by the transliteration work support device 100.

Figure 4:
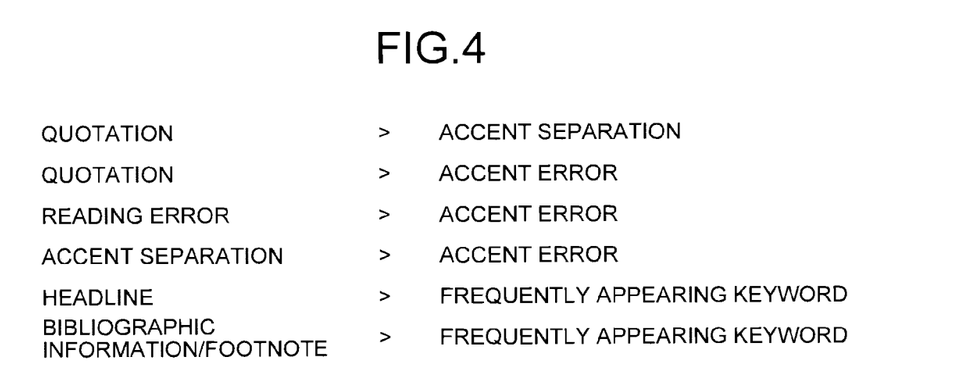
FIG. 4 is a schematic diagram illustrating examples of the constraint condition between work items in the embodiment.

FIG. 4 is a schematic diagram illustrating examples of the constraint condition between the work items in the embodiment. For example, it is indicated that the work "quotation" is preferably performed prior to the work "accent separation". The constraint conditions may be changed by the operator at any time, for example. A plurality constraint condition patterns may be prepared and a single constraint condition pattern may be selected in accordance with a document genre.

Referring back to FIG. 1, the display unit 5 displays an operation screen for performing the transliteration work. The reception unit 6 receives operation input relating to the correction of the document data or the transliteration auxiliary information from the operator. The reception unit 6 receives the operator's operation input via a mouse or a keyboard, for example. The reception unit 6 transmits input information according to the operation input to the correction unit 7. The correction unit 7 corrects the document data or the transliteration auxiliary information in the content data DB 11 in accordance with the input information. The update unit 8 updates the correction history DB 12 and the work list information DB 13 in accordance with the correction performed by the correction unit 7. The update unit 8 transmits the updated work list information to the display unit 5. The display unit 5 displays the work list information.

Figure 5:
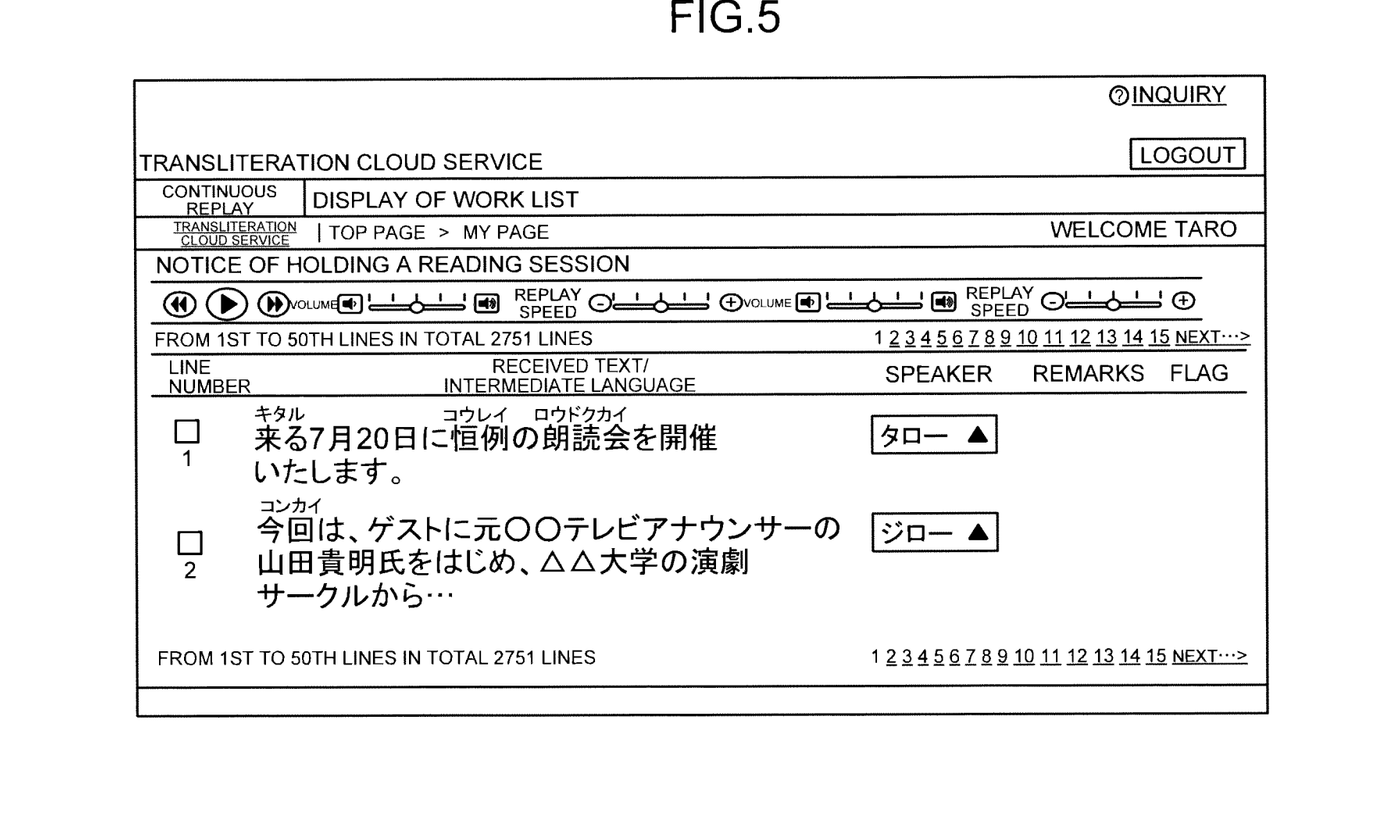
FIG. 5 is a schematic diagram illustrating an exemplary basic screen of the transliteration work support device in the embodiment.

The following describes the operation of the construction unit 4, the display unit 5, the reception unit 6, the correction unit 7, and the update unit 8 in detail with reference to FIGS. 5 to 11. FIG. 5 is a schematic diagram illustrating an exemplary basic screen of the transliteration work support device 100 in the embodiment. As the example illustrated in FIG. 5, the display unit 5 displays the sentences of the document data. The operator creates desired voice content data while correcting the readings and accent errors in the respective sentences, and selecting and designating speakers of synthesized voices reading aloud the sentences via the basic screen in FIG. 5, for example. When the reception unit 6 receives the operation input that indicates the selection of "display work list" in FIG. 5 from the operator, the display unit 5 displays the work list information about the document data serving as the correction target.

Figure 6:
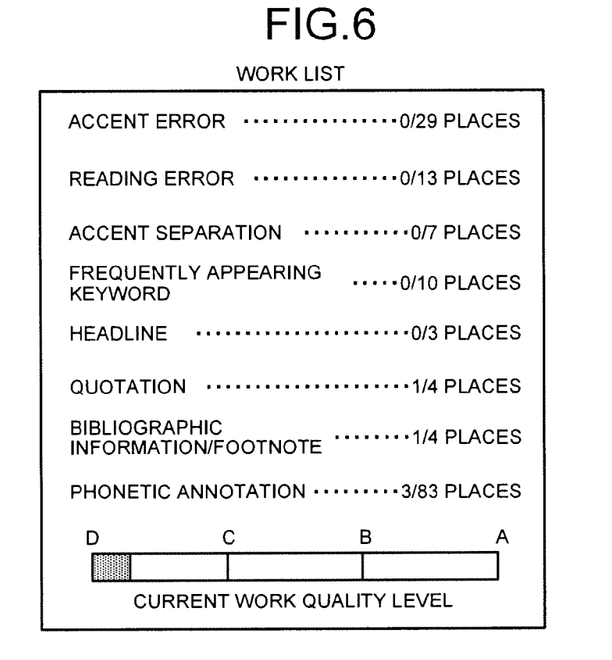
FIG. 6 is a schematic diagram illustrating an exemplary display of work list information in the embodiment.
Figure 7:
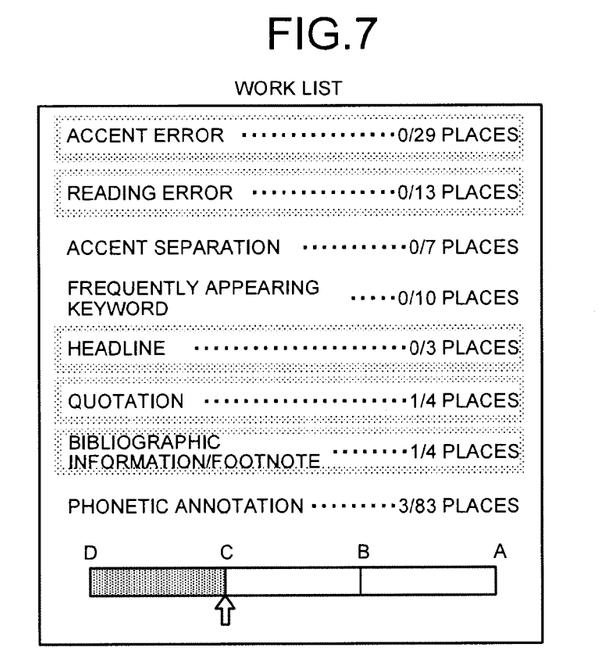
FIG. 7 is a schematic diagram illustrating another exemplary display of the work list information in the embodiment.

FIGS. 6 and 7 are schematic diagrams illustrating exemplary displays of the work list information in the embodiment. The display example of the work list information in FIG. 6 includes eight types of work items, the total numbers of correction places in each work item, the progress information (the numbers of already corrected places) about the works in each work item, and the current work quality level. For example, it is indicated that the total number of correction places in the work item "quotation" is four and one of them is already corrected. The current work quality level indicates the quality of the voice content when voice synthesis is performed using the document data and the transliteration auxiliary information under the current correction condition. The following describes a relation between the work quality level and the scores of the respective work items.

The work quality level is determined by the construction unit 4 based on the sum of the scores of all of the work items included in the work list information and the current progress information. For example, in the work list information illustrated in FIG. 3, the sum of the scores of all of the work items is 233 (50+38+33+40+17+20+25+10=233). For example, the work quality levels are defined as rank A, rank B, rank C, and rank D in the descending order of quality. For example, when the correction work equivalent to 60% of the sum of the scores is performed, the work quality level is defined as rank C. In the work list information illustrated in FIG. 3, 60% of the sum of the scores is 139.8 (233× 0.6=139.8).

FIG. 7 illustrates an example in which, when the work quality level is intended to be rank C, the work items that will likely to increase scores readily are highlighted. In the example illustrated in FIG. 7, the construction unit 4 determines that "accent error", "reading error", "headline", "quotation", and "bibliographic information/footnote" are highlighted out of the work items in the work list information. The following describes operation of the construction unit 4 to determine the work items to be highlighted.

The construction unit 4 sequences the work items in the descending order of the scores. In the example of the work list information illustrated in FIG. 3, the work items are sequenced as follows: "accent error (50)">"frequently appearing keyword (40)">"reading error (38)">"accent separation (33)">"bibliographic information/footnote (25) ">"quotation (20)">"headline (17)">"phonetic annotation (10)".

The construction unit 4, then, changes the order of the work items taking into consideration the constraint conditions between the work items. For example, in order to perform "accent error (50)" having the highest score, it is necessary to perform "quotation (20)" and "reading error (38)" prior to performing "accent error (50)". The construction unit 4, thus, changes the order of the work items to the following order: "quotation (20)">"reading error (38)">"accent error (50)">"frequently appearing keyword (40)">"accent separation (33)">"bibliographic information/footnote (25)">"headline (17)">"phonetic annotation (10)", for example. The sum of the scores is 108 when "quotation (20)", "reading error (38)", and "accent error (50)" are performed. Because 60% of the sum of the scores do not reach 139.8, the construction unit 4 further changes the order of the work items.

For example, in order to perform "frequently appearing keyword (40)" having the second highest score, it is necessary to perform "headline (17)" and "bibliographic information/footnote (25)" prior to performing "frequently appearing keyword (40)". The construction unit 4, thus, further changes the order of the work items to the following order: "quotation (20)">"reading error (38)">"accent error (50)">"headline (17)">"bibliographic information/footnote (25)">"frequently appearing keyword (40)">"accent separation (33)">"phonetic annotation (10)", for example. The sum of the scores is 150 when "quotation (20)", "reading error (38)", "accent error (50)", "headline (17)", and "bibliographic information/footnote (25)" are performed. As a result, 60% of the sum of the scores reaches 139.8. The construction unit 4, thus, determines "quotation (20)", "reading error (38)", "accent error (50)", "headline (17)", and "bibliographic information/footnote (25)" as the work items to be highlighted.

The construction unit 4 may present not only single combination but also some combinations as the combination of the work items necessary to achieve a desired work quality level.

Figure 8:
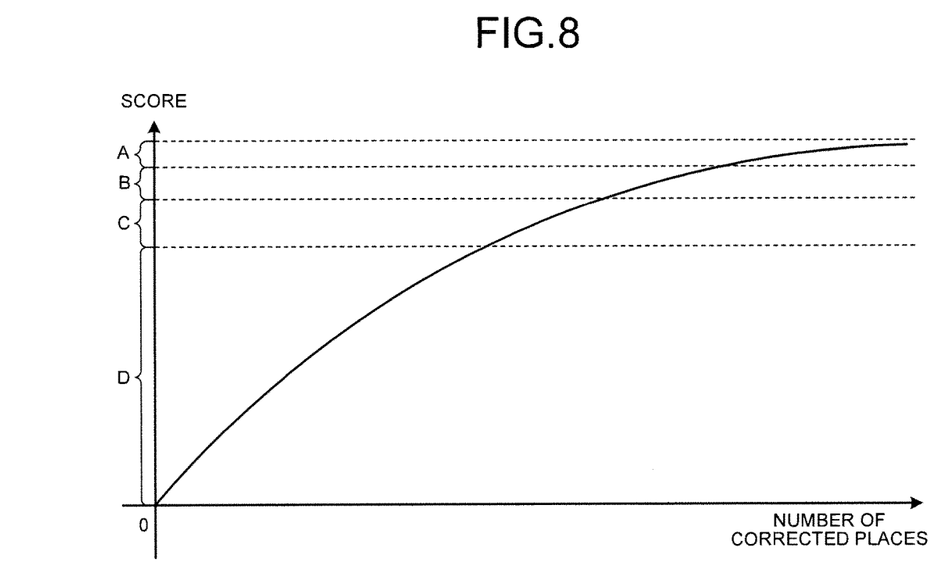
FIG. 8 is a schematic diagram illustrating a relation between the number of corrected places and a work quality level in the embodiment.

FIG. 8 is a schematic diagram illustrating a relation between the number of corrected places and the work quality level in the embodiment. The abscissas axis represents the number of corrected places. The ordinate axis represents the work quality level (score). The graph illustrates the increase in score when the work items are performed in the following order: "quotation (20)">"reading error (38)">"accent error (50)">"headline (17)">"bibliographic information/footnote (25)">"frequently appearing keyword (40)">"accent separation (33)">"phonetic annotation (10)", for example.

The following describes a case in which the reception unit 6 receives, from the operator, the operation input to select a single work item from the work list information. The work item "accent error" and the work item "headline" are described as examples.

Figure 9:
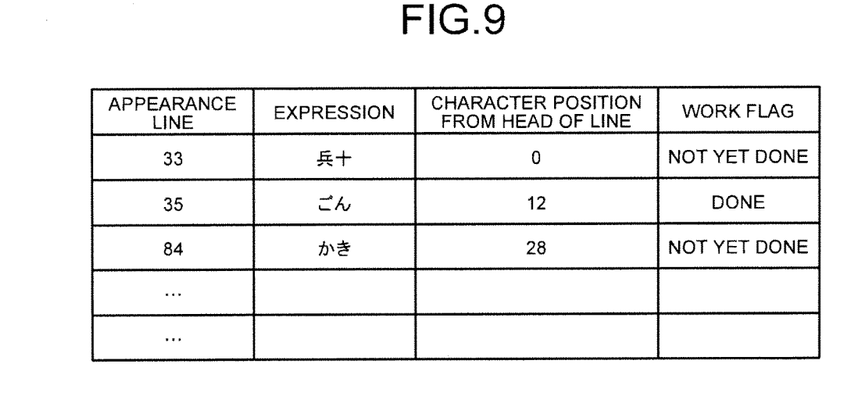
FIG. 9 is a schematic diagram illustrating an exemplary display of the work item (accent error) in the embodiment.

FIG. 9 is a schematic diagram illustrating an exemplary display of the work item (accent error) in the embodiment. In the example in FIG. 9, an appearance line, an expression, a character position from the head of the line, and a work flag are displayed. The appearance line indicates the sentence line including the word or the phrase serving as the correction target. The expression indicates the word or the phrase serving as the correction target. The character position from the head of the line indicates the order of the head character of the word or the phrase serving as the correction target from the head of the line. The work flag indicates whether the word or the phrase serving as the correction target has been corrected. The example in FIG. 9 indicates that the expression "" serving as the correction place is present at the head (0th character from the line head) of the 33rd line in the sentences included in the document data, and that the correction has not yet been performed.

Figure 10:
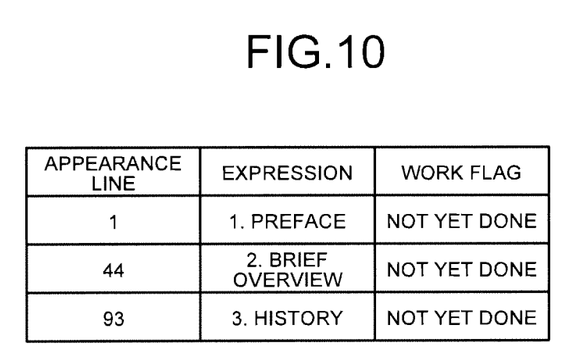
FIG. 10 is a schematic diagram illustrating another exemplary display of the work item (headline) in the embodiment.

FIG. 10 is a schematic diagram illustrating another exemplary display of the work item (headline) in the embodiment. In the example in FIG. 10, the appearance line, the expression, and the work flag are displayed. The appearance line indicates the sentence line including the word or the phrase serving as the correction target. The expression indicates the word or the phrase serving as the correction target. The work flag indicates whether the word or the phrase serving as the correction target has been corrected. The example in FIG. 10 indicates that the expression "1. preface" serving as the correction place is present at the first line in the sentences included in the document data, and that the correction has not yet been performed.

The display unit 5 may set the appearance line and the expression in FIG. 9 (FIG. 10) as hyperlinks and display the corresponding places in the document data when the hyperlinks are selected. When the document in the document data is displayed as illustrated in FIG. 5 while the operator corrects a single work item, the display unit 5 may display the lines of the document in the document data by filtering the lines of the document in the document data with the appearance lines in FIG. 9 (FIG. 10).

Figure 11:
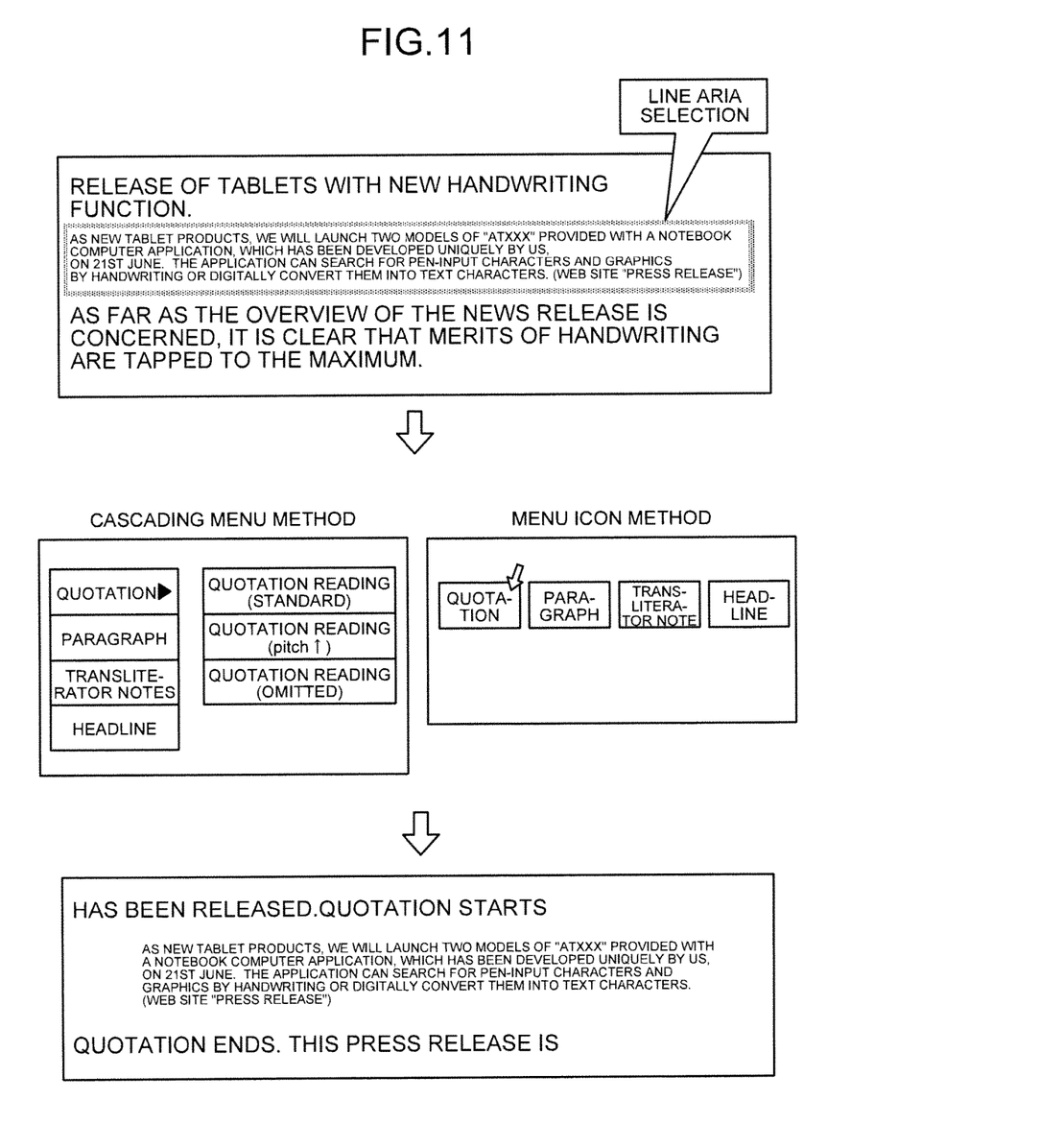
FIG. 11 is a schematic diagram illustrating an example of a GUI for correction of the transliteration work support device in the embodiment.

FIG. 11 illustrates an example of a graphic user interface (GUI) for correction displayed when correcting the correction place while the operator actually refers to the correction candidate. FIG. 11 illustrates the GUI for correction when the work item is "quotation". The sentences on the upper side in FIG. 11 are the text in the document data input to the transliteration work support device 100. In the example in FIG. 11, the quoted part in the sentences is highlighted. The quoted part is identified by the analysis unit 1 in the language analysis based on the depth of indent, for example. The quoted part may be identified and selected by the user in the correction.

The cascading menu method in FIG. 11 dynamically displays a context menu when an area in the quoted part is right-clicked with a mouse, for example. The example in FIG. 11 is a case in which the operator selects "quotation" and performs input operation to select "quotation reading (standard)" as the correction candidate.

When receiving the input information indicating the operation input from the reception unit 6, the correction unit 7 inserts the word "quotation start" (reading voice) at the beginning of the quotation and the word "quotation end" (reading voice) at the end of the quotation. The correction unit 7 may add the words "quotation start" and "quotation end" to the sentence of the document data, or add "quotation start" and "quotation end" to the quoted part in the transliteration auxiliary information as the reading voices without any change in the document data. Next, the correction unit 7 corrects a reading speed and a pitch of the quoted part in the transliteration auxiliary information to "quotation reading (standard)".

The correction unit 7 achieves those designations as control tags that a voice synthesis engine used for voice synthesis can accept, for example. An exemplary format of the control tag is <prosody pitch="+2">(quotation)</prosody>. The correction unit 7 stores the control tags in the document data or the transliteration auxiliary information (metadata) in the content data DB 11. As a result, when the voice synthesis engine performs voice synthesis on the quoted part, "quotation start" and "quotation end" are added as the reading voices, and the quoted part is read aloud with the reading speed "quotation reading (standard)" and the pitch "quotation reading (standard)".

The display unit 5 may display "quotation" and "quotation reading (standard)" by highlighting them by default in the cascading menu method in FIG. 11 based on the information indicating the correction candidate for the quoted part in the work list information. As a result, the operator can correct the document data or the transliteration auxiliary information with reference to the correction candidate. The operator, however, does not necessarily select "quotation reading (standard)" highlighted as the correction candidate. For example, when the reception unit 6 receives the operation input to select "quotation reading (pitch↑)" from the operator, the correction unit 7 inserts "quotation start" and "quotation end" to the beginning and the end of the quoted part, respectively, and performs correction to increase the setting for the reading pitch of the quoted part in the transliteration auxiliary information.

The menu icon method in FIG. 11 displays a row of icons as a navigation menu fixedly on the upper side of the window of the GUI for correction. Correction instructions may be received from the operator using such menu icon method.

Figure 12:
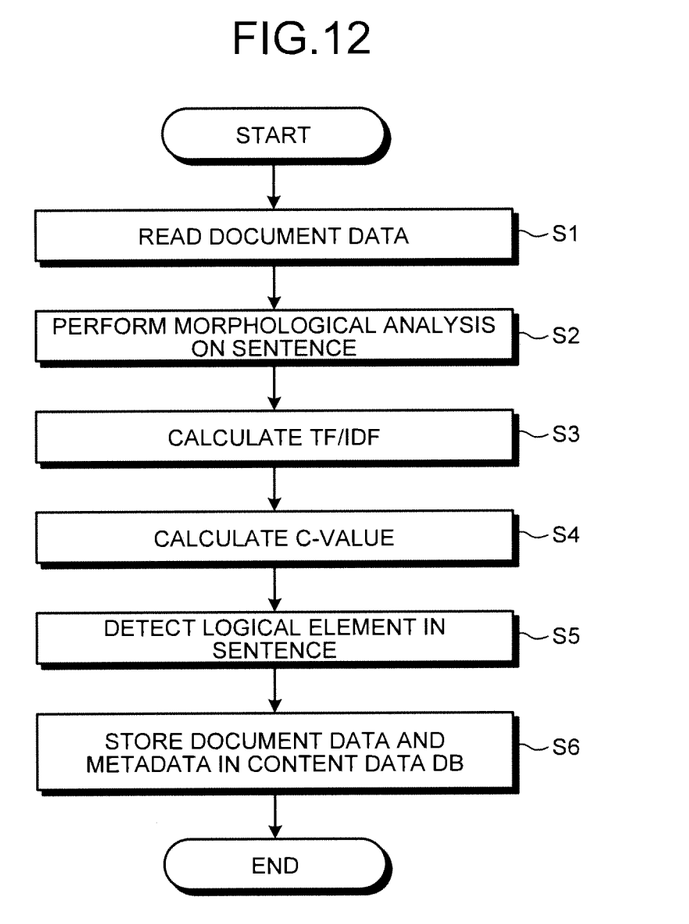
FIG. 12 is a flowchart illustrating exemplary processing performed by an analysis unit in the embodiment.

The following describes a transliteration work support method in the embodiment with reference to a flowchart. FIG. 12 is a flowchart illustrating exemplary processing performed by the analysis unit 1 in the embodiment. The analysis unit 1 reads the document data (step S1). The analysis unit 1 performs a morphological analysis on the document included in the document data (step S2). The analysis unit 1 calculates the TF/IDFs as the statistical information about the words and the phrases included in the document data (step S3). The analysis unit 1 calculates the C-values as the statistical information about the words and the phrases included in the document data (step S4). The analysis unit 1 detects the logical elements that indicate the layout of the document included in the document data (step S5). The analysis unit 1 creates the transliteration auxiliary information from the information that indicates the results of the language analysis (the morphological analysis result and the detection result of the logical elements). The analysis unit 1 adds the statistical information (TF/IDFs and C-values) to the transliteration auxiliary information to form the metadata, and stores the document data and the metadata in the content data DB 11 in association with each other (step S6).

Figure 13:
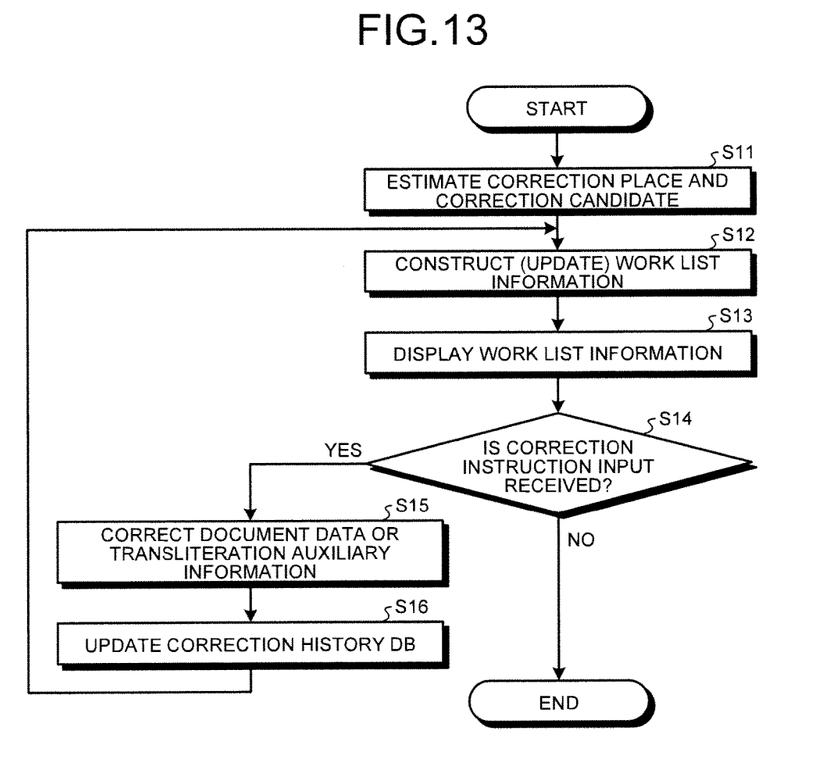
FIG. 13 is a flowchart illustrating exemplary correction processing performed by the transliteration work support device in the embodiment.

FIG. 13 is a flowchart illustrating exemplary correction processing of the way of transliteration of the words and the phrases in the transliteration work support device 100 in the embodiment. The estimation unit 3 separates the sentences included in the document data into words and phrases such as specific words and phrases on the basis the transliteration auxiliary information included in the metadata. The estimation unit 3 searches the correction history DB 12 using the words and the phrases as search keys and estimates the correction places (words and phrases serving as correction targets) and correction candidates of the transliteration auxiliary information (step S11). The construction unit 4 constructs the work list information that includes the work items corresponding to the respective types of corrections according to the correction candidates and the progress information about the work items (step S12). The display unit 5 displays the work list information (step S13). The reception unit 6 determines whether a correction instruction input is received from the operator (step S14). If no correction instruction input has been received from the operator (No at step S14), the processing ends.

If a correction instruction input is received from the operator (Yes at step S14), the reception unit 6 transmits the input information based on the correction instruction input to the correction unit 7. The correction unit 7 corrects the document data or the transliteration auxiliary information in accordance with the input information (step S15). The update unit 8 updates the correction history DB 12 in accordance with the correction performed by the correction unit 7 (step S16). The processing returns to step S12, at which the update unit 8 updates the work list information DB 13 in accordance with the correction performed by the correction unit 7.

The transliteration work support device 100 supports the operator's transliteration work by repeating the processing from step S12 to step S16.

In the transliteration work support device 100 according to the embodiment thus described, the estimation unit 3 estimates the correction places and the correction candidates of the document data or the transliteration auxiliary information from the correction history, and the construction unit 4 constructs the work list information that includes the work items corresponding to the respective types of corrections according to the correction candidates and includes the progress information about the work items. As a result, the operator can preliminarily know the correction places and the correction candidates from the work list information before actually hearing the voice content, thereby making it possible to efficiently perform the transliteration work.

Figure 14:
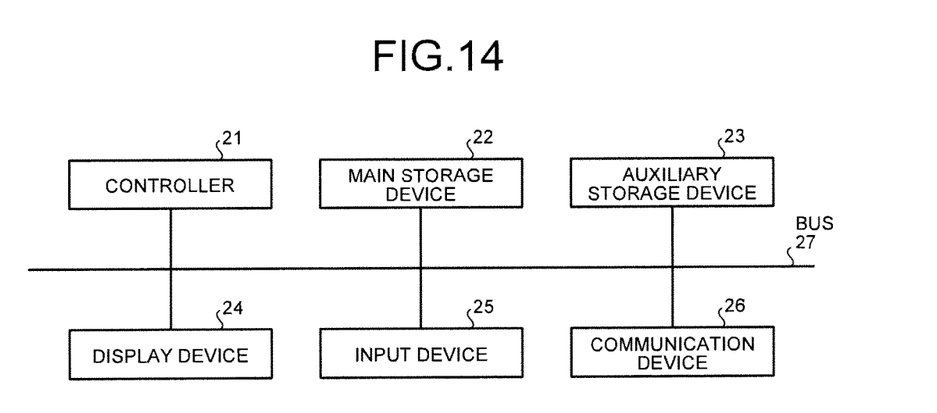
FIG. 14 is a schematic diagram illustrating an exemplary hardware structure of the transliteration work support device in the embodiment.

The following describes a hardware structure of the transliteration work support device 100 in the embodiment. FIG. 14 is a schematic diagram illustrating an exemplary hardware structure of the transliteration work support device 100 in the embodiment.

The transliteration work support device 100 in the embodiment includes a controller 21, a main storage device 22, an auxiliary storage device 23, a display device 24, an input device 25, and a communication device 26. The controller 21, the main storage device 22, the auxiliary storage device 23, the display device 24, the input device 25, and the communication device 26 are connected to one another via a bus 27.

The controller 21 executes a computer program read in the main storage device 22 from the auxiliary storage device 23. The main storage device 22 is a memory such as a read only memory (ROM) or a random access memory (RAM). The auxiliary storage device 23 is a hard disc drive or a memory card, for example. The display device 24 displays a state of the transliteration work support device 100, for example. The display device 24 is a liquid crystal display, for example. The input device 25 is an interface to operate the transliteration work support device 100. The input device 25 is a keyboard or a mouse, for example. The communication device 26 is an interface to connect the transliteration work support device 100 to a network.

The program executed by the transliteration work support device 100 in the embodiment may be recorded on a computer-readable recording medium such as a compact disc read only memory (CD-ROM), a flexible disk (FD), a compact disc recordable (CD-R), and a digital versatile disc (DVD), as an installable or executable file, and provided as a computer program product. The program executed by the transliteration work support device 100 in the embodiment may be stored in a computer connected to a network such as the Internet, and be provided by being downloaded via the network. The program executed by the transliteration work support device 100 in the embodiment may be provided or distributed via a network such as the Internet without being downloaded. The program executed by the transliteration work support device 100 in the embodiment may be embedded and provided in a ROM, for example.

The program executed by the transliteration work support device 100 in the embodiment has a module structure including the functional blocks (the analysis unit 1, the estimation unit 3, the construction unit 4, the correction unit 7, and the update unit 8) achievable by the program out of the functional blocks in the transliteration work support device 100.

In actual hardware, the controller 21 reads the program from the storage medium and executes the program. As a result, the respective modules are loaded in the main storage device 22. The respective modules are formed in the main storage device 22. A part or the whole of the respective functional blocks in the transliteration work support device 100 may be achieved by hardware such as an integrated circuit (IC) without using the program.

The storage unit 2 is achieved by the main storage device 22 and the auxiliary storage device 23. The display unit 5 is achieved by the display device 24. The reception unit 6 is achieved by the input device 25.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A transliteration work support device, comprising:
   an analysis unit configured to perform language analysis on document data and create transliteration auxiliary information that represents a way of transliteration of a word or a: phrase included in the document data in which voices of voice data are expressed for voice synthesis;
   a storage unit configured to store therein a correction history that represents a way of transliteration, which has been corrected in the past, of the word or the phrase;
   an estimation unit configured to estimate, from the correction history, (1) at least one of a correction place of the document data or a correction place of the transliteration auxiliary information, and (2) at least one of a correction candidate of the document data or a correction candidate of the transliteration auxiliary information;
   a construction unit configured to construct work list information that includes work items corresponding to respective types of corrections according to the correction candidate of the document data or the correction candidate of the transliteration auxiliary information and includes progress information about the work items;
   a correction unit configured to receive a correction instruction and correct the correction place of the document data or the correction place of the transliteration auxiliary information; and
   an update unit configured to update the correction history and the progress information in the work list information in accordance with the correction performed by the correction unit,
   wherein the construction unit and the update unit control the work list information to improve a quality of a voice content that is created when voice synthesis is performed using the document data and the transliteration auxiliary information.

2. The device according to claim 1, further comprising:
   a display unit configured to display the work list information to an operator; and
   a reception unit configured to receive the correction instruction by the operator.

3. The device according to claim 1, wherein
   the work list information further includes quality information about the voice content that is to be created when the voice synthesis is performed using the document data and the transliteration auxiliary information, and
   the update unit further updates the quality information in the work list information in accordance with the updated result of the document data or the transliteration auxiliary information.

4. The device according to claim 1, wherein the transliteration auxiliary information includes statistical information that represents an appearance frequency of the word or the phrase and logical element information that represents a layout of the word or the phrase included in the document data.

5. The device according to claim 4, wherein the statistical information includes a unique expression that expresses a land name, a person's name, or a quantity expression and the statistical information about an unknown word or an unknown phrase that is not defined in dictionaries.

6. The device according to claim 4, wherein the construction unit calculates scores of the work items from the statistical information about the word or the phrase corresponding to the correction place of the document data or the correction place of the transliteration auxiliary information and from the type of correction according to the correction candidate of the document data or the correction candidate of the transliteration auxiliary information, and changes a display method of the work item based on the scores.

7. The device according to claim 6, wherein the construction unit highlights displays of a certain number of work items in a descending order of the scores.

8. The device according to claim 4, wherein the estimation unit estimates, further based on the logical element information, the correction place of the document data or the correction place of the transliteration auxiliary information, and the correction candidate of the document data or the correction candidate of the transliteration auxiliary information.

9. A transliteration work support method performed by a transliteration work support device, the method comprising:
   performing language analysis on document data and creating transliteration auxiliary information that represents a way of transliteration of a word or a phrase included in the document data in which voices of voice data are expressed for voice synthesis;
   referring to a correction history that represents a way of transliteration, which has been corrected in the past, of the word or the phrase;
   estimating, from the correction history, (1) at least one of a correction place of the document data or a correction place of the transliteration auxiliary information, and (2) at least one of a correction candidate of the document data or a correction candidate of the transliteration auxiliary information;
   constructing work list information that includes work items corresponding to respective types of corrections according to the correction candidate of the document data or the correction candidate of the transliteration auxiliary information and includes progress information about the work items;
   receiving a correction instruction and correcting the correction place of the document data or the correction place of the transliteration auxiliary information;

updating the correction history and the progress information in the work list information in accordance with the correction at the correcting; and controlling the work list information to improve a quality of a voice content that is created when voice synthesis is performed using the document data and the transliteration auxiliary information.

10. A computer program product comprising a non-transitory computer-readable medium including programmed instructions, the instructions causing a computer that includes a storage unit storing therein a correction history representing a way of transliteration, which has been corrected in the past, of a word or a phrase, to function as:

an analysis unit configured to perform language analysis on document data and create transliteration auxiliary information that represents a way of transliteration of a word or a phrase included in the document data in which voices of voice data are expressed for voice synthesis;

an estimation unit configured to estimate, from the correction history, (1) at least one of a correction place of the document data or a correction place of the transliteration auxiliary information, and (2) at least one of a correction candidate of the document data or a correction candidate of the transliteration auxiliary information;

a construction unit configured to construct work list information that includes work items corresponding to respective types of corrections according to the correction candidate of the document data or the correction candidate of the transliteration auxiliary information and includes progress information about the work items;

a correction unit configured to receive a correction instruction and correct the correction place of the document data or the correction place of the transliteration auxiliary information; and an update unit configured to update the correction history and the progress information in the work list information in accordance with the correction performed by the correction unit, wherein the construction unit and the update unit control the work list information to improve a quality of a voice content that is created when voice synthesis is performed using the document data and the transliteration auxiliary information.

* * * * *